April 29, 1941. F. K. FISCHER 2,239,912
CLOSURE MEMBER FOR HIGH PRESSURE HEADS
Filed April 21, 1938
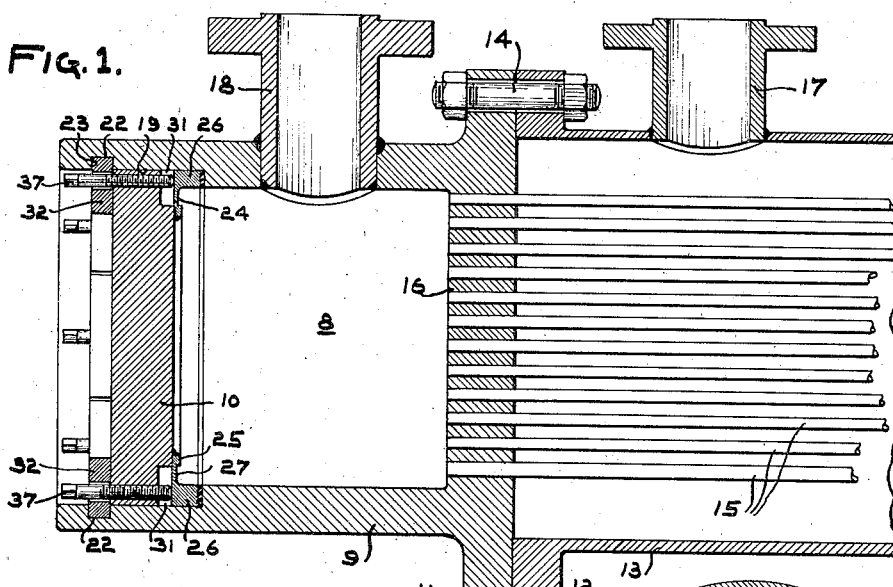
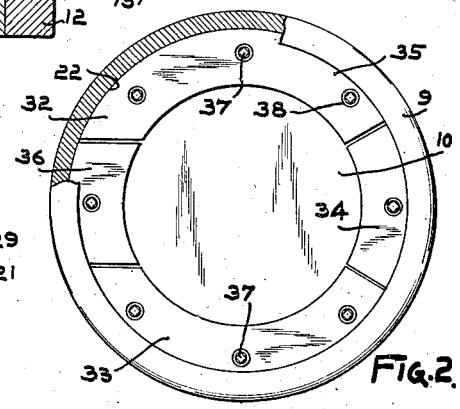
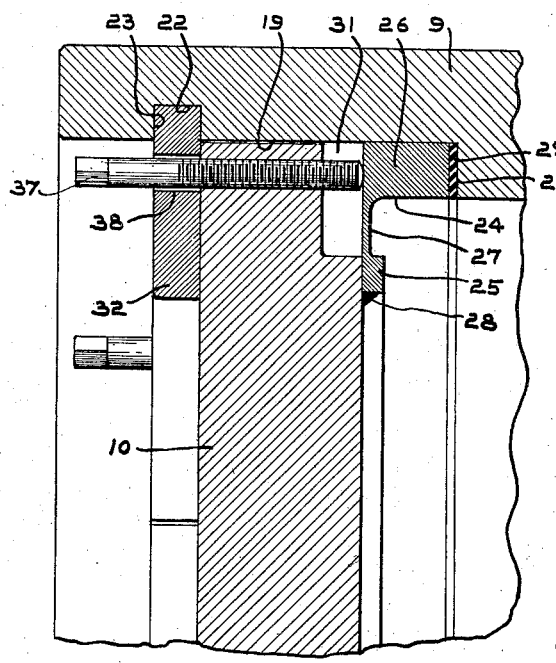
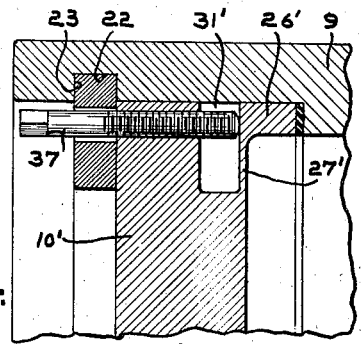
WITNESSES:
Ralph T. French
James F. Moser
INVENTOR
FREDERICK K. FISCHER.
BY
A. B. Purvis
ATTORNEY Patented Apr. 29, 1941

2,239,912

UNITED STATES PATENT OFFICE 2,239,912

CLOSURE MEMBER FOR HIGH PRESSURE HEADS

Frederick K. Fischer, Prospect Park, Pa., assignor to Westinghouse Electric & Manufacturing Company, East Pittsburgh, Pa., a corporation of Pennsylvania Application April 21, 1938, Serial No. 203,291

8 Claims. (Cl. 220—46)

My invention relates to closures for pressure vessels and more particularly to covers or closure members for high-pressure heads of heat exchange apparatus.

A further object of my invention is the provision of a closure for high-pressure heads wherein the sealing load is transmitted to a shear ring by bolts under compression.

Another object of my invention is the provision of a closure for a high-pressure head having sealing engagement with said head and an arrangement of bolts under compression for applying sealing pressure, the heads of the bolts being accessible at all times for adjustment of the sealing pressure.

A further object of my invention is the provision of a cover for a high-pressure head which cover includes a relatively rigid pressure sustaining portion and an integral flexible sealing portion.

Another object of my invention is the provision of a closure assembly for a high-pressure head wherein a sealing ring is flexible relative to, yet permanently united with, a main cover member, whereby the sealing ring and cover, together with means for exerting sealing pressure on the former, may be applied to and removed from the high-pressure head as a unit.

These and other objects are effected by my invention as will be apparent from the following description and claims taken in connection with the accompanying drawing, forming a part of this application, in which:

Fig. 1 is a longitudinal sectional view of a portion of a tubular heat exchanger constructed in accordance with the invention;

Fig. 2 is an end elevational view of the structure shown in Fig. 1 with a portion broken away for the sake of clearness;

Fig. 3 is an enlarged sectional view of a portion of the structure in Fig. 1; and, Fig. 4 is a view similar to Fig. 3, showing a modification.

In the drawing, there is shown a high-pressure head 8 including a body member 9 and a cover 10. The body member has a flange 11 at one end by which it is secured to a flange 12 of a tubular heat exchanger shell 13, by suitable means, such as bolts 14. Tubes 15 have terminal portions secured in the tube plate wall 16 of the body member, and they extend longitudinally through the shell to the outlet end (not shown) of the heat exchanger. As is usual, the shell 13 has an inlet 17, and, where the heat exchanger is of the single-pass type, as herein illustrated, the head is provided with an inlet 18 for the admission of fluid under high pressure.

The body member 9 has an opening at one end which is counterbored at 19 to receive the cover 10 and to provide a radially extending sealing shoulder or surface 21 inwardly of the cover. Outwardly of the cover, the wall has an inwardly opening circumferential groove 22 providing a radially extending thrust shoulder 23 facing the sealing surface 21.

An annular sealing member 24, having heavy inner and outer rim portions 25 and 26, respectively, united by an annular intermediate thin flexible web 27, is disposed with the inner rim portion permanently attached to the inner face of the cover 10, preferably by welding, as at 28. The outer rim portion cooperates with the sealing surface 21, and, preferably, a gasket 29 is interposed therebetween. When conditions are suitable, the gasket may be omitted and sealing secured by direct contact. The thin flexible web 27, between the inner and outer rims, permits a limited movement of the outer rim toward or away from the cover 10, for a purpose to be hereinafter described.

A shear ring 32 closely fits in the groove 22 and abuts the thrust shoulder 23 thereof. To facilitate assembly of the shear ring 32 in the groove 22, the former is divided into a plurality of arcuate sections or shear pieces, for example, 33, 34, 35 and 36. To provide for contiguity of adjacent end faces of the sections and for insertion and removal of the latter, all of such faces extend radially except the faces at either end of the section 36, which are parallel, thereby providing for insertion of the latter section last and removal thereof first.

A plurality of bolts 37 are threadedly mounted in the cover near the outer edge of the latter and extend entirely therethrough so that their inner ends contact the outer surface of the rim 26 of the sealing member and transmit sealing pressure therefrom to the cover, the pressure applied to the latter being transmitted to the shear ring 32, and thence to the thrust shoulder 23. Preferably, the inner face of the cover 10 is relieved at its outer edge, as at 31, to permit free flexing of the annular intermediate web 27 to effect the desired sealing at 21.

The shear ring is provided with openings 38 aligned with the bolts 37, and through which said bolts freely extend with the heads thereof positioned externally of the shear ring and cover. By this construction, adjustment of the sealing pressure at the sealing surface 21 may be effected at all times, even when the head is under high internal pressure, and, furthermore, radial displacement of the shear pieces from the groove 22 is prevented. The pressure within the head is transmitted, for the most part, directly to the cover, and the sealing member 26 transmits a small portion of the pressure load thereto through the bolts 37. Thus the bolts are subjected only to the pressure required for sealing and they act in compression instead of tension, as heretofore.

A further advantage of this arrangement lies in the elimination of bolts extending through the rim 26 into the head for application of sealing pressure, and the consequent permissible narrowing of the sealing surface 21, the use of a narrower sealing surface permitting a corresponding reduction in thickness of the body member wall.

In Fig. 4 there is shown a modified construction which differs from that previously described in that the rigid sealing rim and flexible intermediate web are formed integral with the cover instead of being made separate and then welded thereto. The cover 10' is provided with a peripheral recess 31' spaced slightly from the inner face of the cover to provide the thin flexible intermediate web 27', at the outer edge of which is the annular rigid sealing rim 26'.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. Apparatus of the character described comprising a hollow, pressure-sustaining body member having a thrust shoulder and a sealing surface; a cover intermediate said thrust shoulder and said sealing surface; a plurality of shear pieces between said cover and said thrust shoulder for transmitting pressure from the former to the latter; an annular sealing member carried by the cover adjacent the sealing surface and having a rim portion and a flexible web portion; means providing sealing engagement of said web portion with the cover; and compression means for urging the rim portion towards the sealing surface.

2. Apparatus of the character described comprising a hollow, pressure-sustaining body member having a thrust shoulder and a sealing surface; a cover disposed intermediate said thrust shoulder and said sealing surface; a plurality of shear pieces between said cover and said thrust shoulder for transmitting pressure from the former to the latter; a sealing portion on the cover adjacent the sealing surface and comprised by a rigid outer annular rim portion and a flexible inner annular connecting portion; an annular weld joining the inner circumference of said annular connecting portion to the cover; and compression means for urging said rigid rim portion toward the sealing surface.

3. Apparatus of the character described comprising a hollow, pressure-sustaining body member having a thrust shoulder and a sealing surface, a cover intermediate said thrust shoulder and said sealing surface and including an annular sealing member adjacent the sealing surface having a relatively sturdy rim portion and a relatively flexible web portion, means providing sealing engagement of said web portion with the cover, and bolts carried by the cover and engaging the rim portion under compression to urge the latter toward said sealing surface, and a plurality of shear pieces between the cover and the thrust shoulder for transmitting pressure from the former to the latter.

4. Apparatus of the character described comprising a hollow, pressure-sustaining body member having a thrust shoulder and a sealing surface; a cover intermediate said thrust shoulder and said sealing surface; a plurality of shear pieces between said cover and said thrust shoulder for transmitting pressure from the former to the latter; said cover including a main portion and an annular sealing portion adjacent the sealing surface having a relatively sturdy rim portion and a relatively flexible web portion; an annular weld forming an autogenous connection between said web portion and the main cover portion; and bolts carried by the main portion and engaging the rim portion under compression to urge the latter toward said sealing surface.

5. Apparatus of the character described comprising a hollow, pressure-sustaining body member having a thrust shoulder and a sealing surface; a cover intermediate said thrust shoulder and said sealing surface and including an annular sealing member adjacent the sealing surface having a relatively sturdy rim portion, a relatively flexible web portion and means providing a fluid-tight connection between said web portion and the remainder of the cover; bolts carried by the cover and engaging the rim portion under compression to urge the latter into sealing relation with the sealing surface, said bolts being accessible exteriorly of the body member for adjustment of the sealing pressure; and a plurality of shear pieces between the cover and the thrust shoulder for transmitting pressure from the former to the latter.

6. Apparatus of the character described comprising a hollow, pressure-sustaining body member having a thrust shoulder and a sealing shoulder; a cover intermediate said thrust shoulder and said sealing shoulder; a plurality of shear pieces between said cover and said thrust shoulder for transmitting pressure from the former to the latter; an annular sealing portion on the cover adjacent the sealing shoulder having an outer rigid rim portion, an inner rigid rim portion, and an intermediate flexible web portion; an annular weld for autogenously connecting the inner circumference of said inner rim portion to the cover; said cover having an annular series of threaded openings extending therethrough and aligned with said rim portion, and said shear pieces having openings for alignment with the threaded openings when they are in assembled relation with respect to said thrust shoulder; and bolts having threads engaging the threads of said openings in the cover, extending through the aligned openings in the shear pieces to retain the latter in position adjacent the thrust shoulder, and having their inner ends contacting the rigid rim portion of the sealing member to urge it into sealing relation with the sealing shoulder; the heads of said bolts being positioned exteriorly of the shear ring and of the cover.

7. Apparatus of the character described comprising a hollow, pressure-sustaining body member having a thrust shoulder and a sealing surface; a plurality of shear pieces adjacent said thrust shoulder; a cover intermediate said shear pieces and the sealing surface having a rim at the outer edge of its inner face and a recess in its peripheral wall of a depth greater than the radial thickness of said rim, said recess being so spaced from the inner face of the cover as to provide a thin flexible web connecting the rim to the cover proper; and means carried by the cover for urging said rim towards the sealing surface.

8. Apparatus of the character described comprising a body including an annular wall portion, said wall portion having an interior outwardly-facing seat arranged intermediately of the length thereof and having a bore extending from the seat to its outer end with an annular groove opening into the bore and arranged intermediately of the seat and said outer end; a cover in said bore, said cover including a main disc-like closing portion and an annular sealing portion, said sealing portion having a relatively sturdy rim portion cooperating with the outwardly-facing seat and a relatively flexible web portion connecting said rim and main closing portions of the cover; a plurality of shear pieces disposed in the annular groove and providing an outer supporting abutment for the cover resisting the force of fluid pressure applied to the latter; means providing a seal between the outwardly-facing seat and the cooperating rim portion of the cover; and bolts carried by the main closing portion of the cover and engaging the rim portion thereof under compression to urge the latter toward said outwardly-facing surface.

FREDERICK K. FISCHER.